(12) United States Patent
Ito

(10) Patent No.: US 7,100,909 B2
(45) Date of Patent: Sep. 5, 2006

(54) FLUID FILLED CYLINDRICAL VIBRATION DAMPING DEVICE

(75) Inventor: Tatsuya Ito, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/850,080

(22) Filed: May 19, 2004

(65) Prior Publication Data
US 2004/0239020 A1   Dec. 2, 2004

(30) Foreign Application Priority Data
May 30, 2003   (JP)   ............... 2003-155323

(51) Int. Cl.
*F16F 13/00* (2006.01)
(52) U.S. Cl. .................. 267/140.12; 267/219
(58) Field of Classification Search ........... 268/140.12, 268/140.17, 219, 220
See application file for complete search history.

(56) References Cited

U.S. PATENT DOCUMENTS

| | | | | |
|---|---|---|---|---|
| 4,700,934 A | * | 10/1987 | Andra et al. | 267/140.12 |
| 5,060,918 A | * | 10/1991 | Kanda | 267/140.12 |
| 5,156,379 A | * | 10/1992 | Tabata | 267/140.12 |
| 5,184,803 A | * | 2/1993 | Tanabe et al. | 267/140.12 |
| 5,188,346 A | * | 2/1993 | Hamada et al. | 267/140.12 |
| 5,375,821 A | * | 12/1994 | Toshimitsu et al. | 267/140.12 |
| 5,918,864 A | * | 7/1999 | Schafer | 267/140.12 |
| 5,947,454 A | * | 9/1999 | Miyamoto | 267/140.12 |
| 6,068,247 A | * | 5/2000 | Rudolph | 267/140.12 |
| 6,364,298 B1 | * | 4/2002 | Vossel et al. | 267/293 |

FOREIGN PATENT DOCUMENTS

| | | |
|---|---|---|
| JP | 1-149044 | 10/1989 |
| JP | 3-9138 | 1/1991 |
| JP | 3-30736 | 5/1991 |
| JP | 4-160244 | 6/1992 |
| JP | 11-30267 | 2/1999 |
| JP | 2000-46097 | 2/2000 |
| JP | 2001-74085 | 3/2001 |

* cited by examiner

*Primary Examiner*—James McClellan
*Assistant Examiner*—Mariano Sy
(74) *Attorney, Agent, or Firm*—Beyer Weaver & Thomas LLP

(57) ABSTRACT

A fluid-filled cylindrical vibration damping device comprising: an elastic body connecting an inner shaft member and an outer sleeve member; a non-compressible fluid-sealing region formed between the inner shaft member and the outer sleeve member; a stop rubber member disposed within the fluid-sealing region and projecting form one of the inner shaft member and the outer sleeve member toward an other of the inner shaft member and the outer sleeve member; and a rigid restricting member bonded to a projecting end portion of the stop rubber member. The stop rubber member extends to a front surface of the rigid restricting member so as to form an abutment rubber projecting from an outer peripheral portion of the front surface so that the projecting end portion of the stop rubber member is brought into abutting contact with the other of the inner shaft member and the outer sleeve member with the abutment rubber.

8 Claims, 5 Drawing Sheets

FLUID FILLED CYLINDRICAL VIBRATION DAMPING DEVICE

INCORPORATED BY REFERENCE

The disclosure of Japanese Patent Application No. 2003-155323 filed on May 30, 2003 including the specification, drawings and abstract is incorporated herein by reference in its entirety.

BACKGROUND OF THE INVENTION

1. Field of the Invention

The present invention relates generally to a cylindrical vibration damping device usable as suspension bushings, engine mounts, body mounts, differential mounts, sub-frame mounts and the like, and more particularly to a cylindrical vibration damping device of fluid-filled type, which is capable of exhibiting vibration damping effects on the basis of flow action of non-compressible fluid sealed in a fluid sealing region enclosed therein, and which includes a stop rubber member installed within the fluid sealing region.

2. Description of the Related Art

A fluid filled cylindrical vibration damping device is known as one type of vibration damping couplings or mounts interposed between two components connected together in a vibration-isolating fashion. Disclosed in Citation 1 or 2 (see a document list in paragraph 0008) is an example of such a fluid-filled cylindrical vibration-damping device including an elastic rubber member elastically connecting a metallic inner shaft member, and a metallic outer sleeve member disposed about the inner shaft member, and a fluid sealing region defined between the inner shaft member and the outer sleeve member. When subjected to vibration applied thereto, the known fluid-filled cylindrical vibration-damping device is able to provide a vibration damping effect on the basis of flow action of non-compressible fluid sealed in the sealing region.

In the above-described known cylindrical vibration damping device, a stopper mechanism utilizing a stop rubber member, protruding from one of the inner shaft member and the outer sleeve member toward the other, is suitably installed in order to limit an amount of elastic deformation of the rubber elastic body in a cushion like manner during input of an excess vibrational load in its axial direction. Typically, the stop rubber member is disposed within the fluid-sealing region, as shown in the above-mentioned Citations 1 and 2, in order to avoid enlargement of the device itself.

However, the conventional stopper mechanism suffers from the inherent problem. Namely, in the event where the stopper rubber member comes into abutting contact at its projecting end portion with the inner shaft member or the outer sleeve member as a result of exertion of an excess external force thereon, a so-called "stick-slip" motion in boundary lubrication may occur in association with the elastic deformation of the stop rubber member. Accordingly, the conventional stop mechanism is prone to induce noises due to friction of the stop rubber member associated with its elastic deformation. Where the stop rubber member is installed in the fluid-sealing region, especially, the induced noises may be transmitted to the rubber elastic body via the sealed non-compressible fluid, and then amplified, so that the generation of noises becomes a significant problem. If a grease or other lubricant is applied to an abutting surface of the stop rubber member to minimize or reduce the noises, the grease is readily dispersed into the non-compressible fluid, making it difficult for the conventional stopper mechanism to provide effective noise damping performance.

To cope with this problem, there has been proposed another stopper mechanism wherein a rigid stop block is employed instead of the stop rubber member, and only a thin stop rubber layer is only formed secured on the a top abutting surface of the stop block, as disclosed in Citations 3 and 4, for example. Since the rigid stop block of the aforesaid structure permits a small amount of elastic deformation thereof upon abutting contact with the inner shaft or outer sleeve member, stick-slip motion at the abutting surface of the rigid stop block is prevented, making it possible to eliminate or minimize generation of the noises.

In the proposed stopper mechanism employing the rigid stop block, however, abutting noises and impact created as a result of abutting contact of the rigid stop block against the inner shaft or outer sleeve member cannot be absorbed only by means of the thin stop rubber layer. Therefore, the proposed stopper mechanism is very likely to suffer from the problem of abutting noises and impact induced upon abutting contact of the rigid stop block against the member. Moreover, the abutting contact of the rigid stop block may cause considerable change of spring characteristics of the vibration-damping device, making it impossible for the device to exhibit moderate load-spring characteristics.

[Citation 1]
JP-A-3-9138
[Citation 2]
JP-B-3-30736
[Citation 3]
JP-A-4-160244
[Citation 4]
JP-U-1-149044

SUMMARY OF THE INVENTION

It is therefore one object of this invention to provide a fluid-filled cylindrical vibration damping device equipped with a stopper mechanism of novel structure that is capable of limiting an amount of elastic deformation of a rubber elastic body during input of a large vibrational load, while eliminating or moderating generation of noises or impact.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a fluid-filled cylindrical vibration damping device comprising: an inner shaft member; an outer sleeve member disposed about the inner shaft member; a rubber elastic body elastically connecting the inner shaft member and the outer sleeve member; a fluid-sealing region formed between the inner shaft member and the outer sleeve member, and having a non-compressible fluid sealed therein; a stop rubber member disposed within the fluid-sealing region and projecting from one of the inner shaft member and the outer sleeve member toward an other of the inner shaft member and the outer sleeve member; and a rigid restricting member bonded to a projecting end portion of the stop rubber member, wherein the vibration damping device exhibits a vibration damping effect based on flow action of the non-compressible fluid flowing within the fluid sealing region during vibration input, and wherein a part of the stop rubber member extends across the rigid restricting member so as to form an abutment rubber situated on and projecting from an outer peripheral portion of a front surface of the rigid restricting member so that the projecting end portion of the stop rubber member is brought into abutting contact with the other of the inner shaft member and the outer sleeve member with the abutment rubber.

In the fluid-filled cylindrical vibration damping device constructed according to the present invention, the stop rubber member itself is entirely formed of a rubber elastic body, making it possible to attenuate shock or abutting noises in association with abutting contact of the stop rubber member against the inner shaft member or the outer sleeve member, while permitting an adequate amount of elastic deformation of the stop rubber member enough for repressing abrupt change in spring characteristics of the damping device which would occur after the abutment of the stop rubber member. In addition, since the rigid restricting member bonded to the projecting end portion of the stop rubber member restricts elastic deformation of the projecting end portion, spring characteristics of the present vibration damping device is non-linearly or moderately increased, after the abutting contact of the stop rubber member against the inner shaft member or the outer sleeve member. With this arrangement, the present vibration-damping device is able to provide an excellent stopper action.

Furthermore, prevented is the direct contact of the rigid restricting member against the inner shaft or outer sleeve member, but instead permitted is an abutment of the abutment rubber on the member. This arrangement effectively eliminate or minimize noises that may be caused by abutting contact of the stop rubber member against the inner shaft or outer sleeve member, while minimizing an amount of elastic deformation in the abutting surface of the abutment rubber, making it possible to minimize generation of noises in association with stick-slip motion of the abutting surface.

Preferably, the rigid restricting member is formed of a metallic material such as aluminum alloy and steel, or alternatively of a rigid synthetic resin material, and has a rigidity greater than at least that of the stop rubber member. While the rigid restricting member may have a variety of configurations, a thin plate configuration may be preferably employed in order to obtain a sufficient volume of the stop rubber member. The abutment rubber is preferably formed only on the outer peripheral portion of the rigid restricting member, and the central portion of the rigid restricting member is preferably deprive of the abutment rubber. Namely, as the volume of the abutment rubber increases, correspondingly increases is an amount of energy storage in accordance with the elastic deformation during abutment of the abutment rubber, resulting in a high tendency of generation of noises due to stick slip motion of the abutment rubber.

A second mode of the invention is a fluid-filled cylindrical vibration-damping device according to the above mentioned first mode, wherein the rigid restricting member comprises a rigid restricting plate of generally rectangular configuration with a circumferential curve conforming to that of the abutting surface of the other of the inner shaft member and the outer sleeve member, and the part of the stop rubber member extending across the rigid restricting plate is at least presented on four corners of the rigid restricting plate to form the abutment rubber.

In the fluid-filled cylindrical vibration damping device constructed according to this mode of the invention, even when the inner shaft member and the outer sleeve member are subjected to relative displacement in a prizing or twisting direction due to external force applied therebetween in a variety of directions, the abutment rubber is always brought into abutting contact first with the abutting surface of the inner shaft or outer sleeve member, effectively avoiding direct contact of the rigid restricting plate against the abutting surface. According to one preferred form of this mode of the invention, the abutting rubber has a configuration extending over a substantially entire circumference of the outer peripheral portion of the rigid restricting plate. This preferred form permits a stable prevention of the direct contact of the rigid restricting plate against the abutting surface.

A third mode of the invention is a fluid-filled cylindrical vibration-damping device according to the above mentioned first or second mode, wherein a cushion rubber layer is formed on the other of the inner shaft member and the outer sleeve member against which the stop rubber member comes into abutting contact.

In the fluid-filled cylindrical vibration damping device constructed according to this mode of the invention, noises or impact induced as a result of the abutting contact of the stop rubber member against the abutting surface of the inner shaft or outer sleeve member can be further effectively attenuated by means of the cushion rubber layer, as well. When the cushion rubber layer is provided on the inner shaft member, it is preferably that the cushion rubber layer is integrally formed with the rubber elastic body.

A fourth mode of the invention is a fluid-filled cylindrical vibration-damping device according to any one of the above-mentioned first through third modes, wherein the rigid restricting member has an area greater than an area of a minimum cross section of the stop rubber member in a direction perpendicular to a projecting direction of the stop rubber member so that the minimum cross section of the stop rubber member is entirely covered by the rigid restricting member.

In the fluid-filled cylindrical vibration damping device of this mode, by means of the rigid restricting member, an external force exerted on the stop rubber member via the abutment rubber is effectively distributed over a substantially entirety of an effective cross sectional area of the stop rubber member. Accordingly, the overall stop rubber member is effectively utilized to provide a stopper action, while ensuring an excellent cushioning effect or durability.

A fifth mode of the invention is a fluid-filled cylindrical vibration-damping device according to any one of the above-mentioned first through fourth modes, wherein the fluid-sealing region comprises at least two fluid chambers including relative pressure fluctuation during input of vibration to the device, and arranged spaced away from each other in a circumferential direction of the device, while being held in fluid communication with each other via an orifice passage, wherein the rubber elastic body has at least one pocket portion open in an outer circumferential surface thereof whose opening is fluid-tightly closed by the outer sleeve member so as to form at least one of the at least two fluid chambers, wherein an orifice defining member is disposed bridging circumferentially the opening of the at least one pocket portion so that the orifice passage is formed and extends between superimposed surfaces of the orifice defining member and the outer sleeve member, and wherein the stop rubber member is bonded onto an inner circumferential surface of the orifice defining member so that the stop rubber member disposed within the fluid chamber while projecting from the orifice defining member toward the inner shaft member.

In the fluid-filled cylindrical vibration damping device constructed according to this mode of the invention, the orifice passage is formed at the outer circumferential portion of the device, thereby assuring a great degree of freedom in designing a length of the passage, while making it possible to form the stop rubber member separately from the rubber elastic body. With this arrangement, a material of the stop rubber member can be desirably selected irrespective of the material of the rubber elastic body, further increasing a degree of freedom in designing the device, and a support for assembly of the stop rubber member with respect to the outer sleeve member is readily provided by utilizing the orifice defining member.

A sixth mode of the invention is a fluid-filled cylindrical vibration-damping device according to any one of the above-mentioned first through fifth modes, wherein the inner shaft member includes at one axial end portion thereof an inner-side slant portion projecting diagonally outward in a diametric direction of the inner shaft member, and the outer sleeve member includes at a corresponding axial end portion thereof an outer-side slant portion projecting diagonally outward in a diametric direction of the outer sleeve member, axially opposed to the inner-side slant portion and with a spacing therebetween, and elastically connected to the inner-side slant portion via a toe correction rubber elastic member interposed therebetween.

In this mode of the invention, the fluid-filled cylindrical vibration damping device of this mode of the invention is preferably used as a suspension bushing of a so-called "toe correction" structure. According to the toe correction type suspension bushing of this mode, even when the rubber stop member comes into contact with a slant against the inner shaft member of the outer sleeve member, as a result of a relative displacement induced between the inner shaft member and the outer sleeve member in a prizing direction due to a force or load dividing action by means of the toe correction structure generated during input of a load in the axial direction of the device, avoided is a direct contact of the rigid restricting member against the abutting surface, and permitted is a contact of the abutment rubber formed on the outer peripheral portion of the rigid restricting member against the abutting surface of the inner shaft member or the outer sleeve member. That is, when the principle of the invention is applied to the toe-correction type suspension bushing that frequently experiences the aforesaid relative displacement between the inner shaft member and the outer sleeve member, the suspension bushing is able to stably and advantageously provides stopper actions owing to the abutting contact of the stop rubber member against the inner shaft member or the outer sleeve member, likewise.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
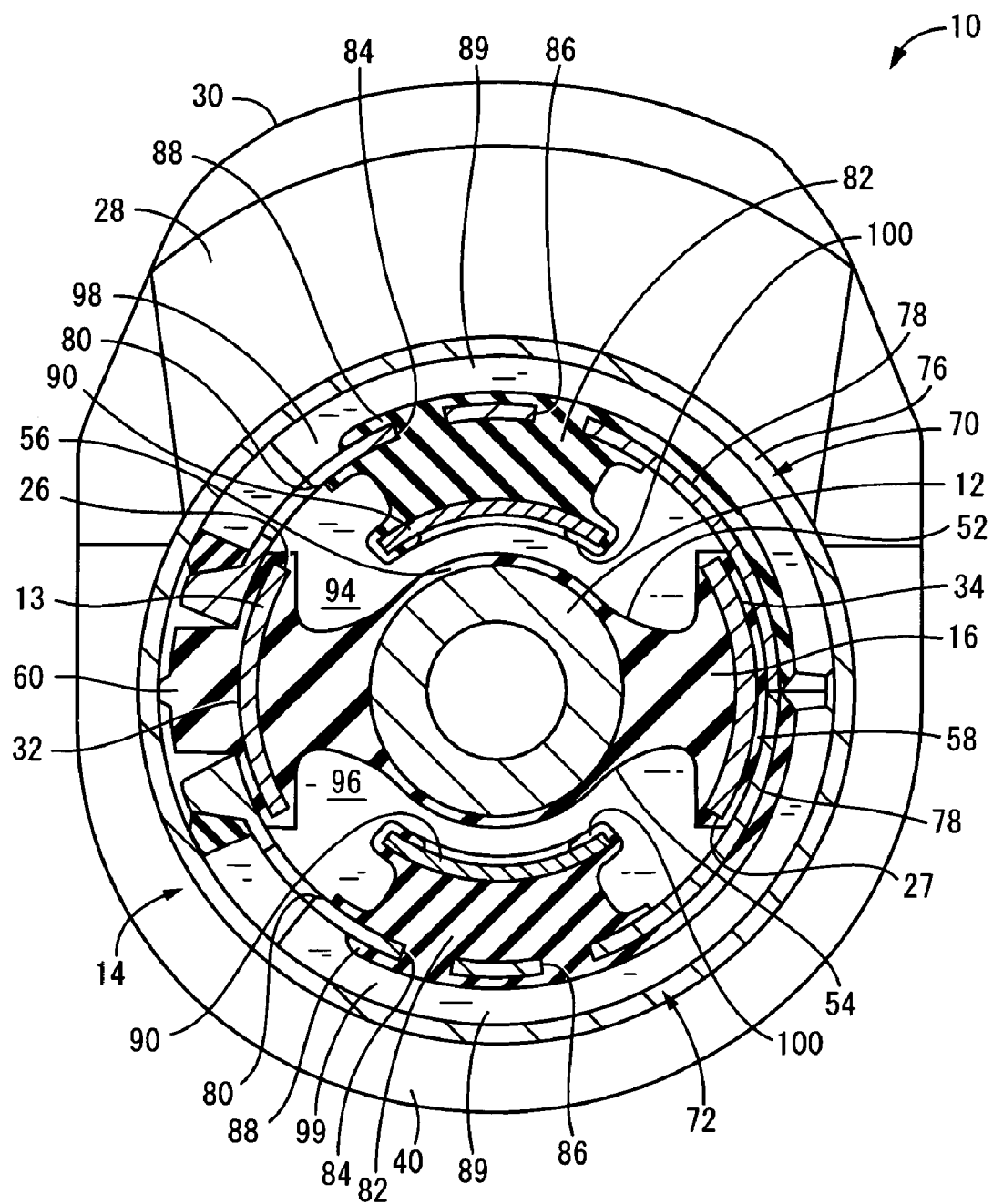
FIG. 1 is a transverse cross sectional view of a fluid-filled cylindrical vibration damping device in the form of a toe correction bushing constructed according to one preferred form of the invention, taken along line 1—1 of FIG. 2.
Figure 2:
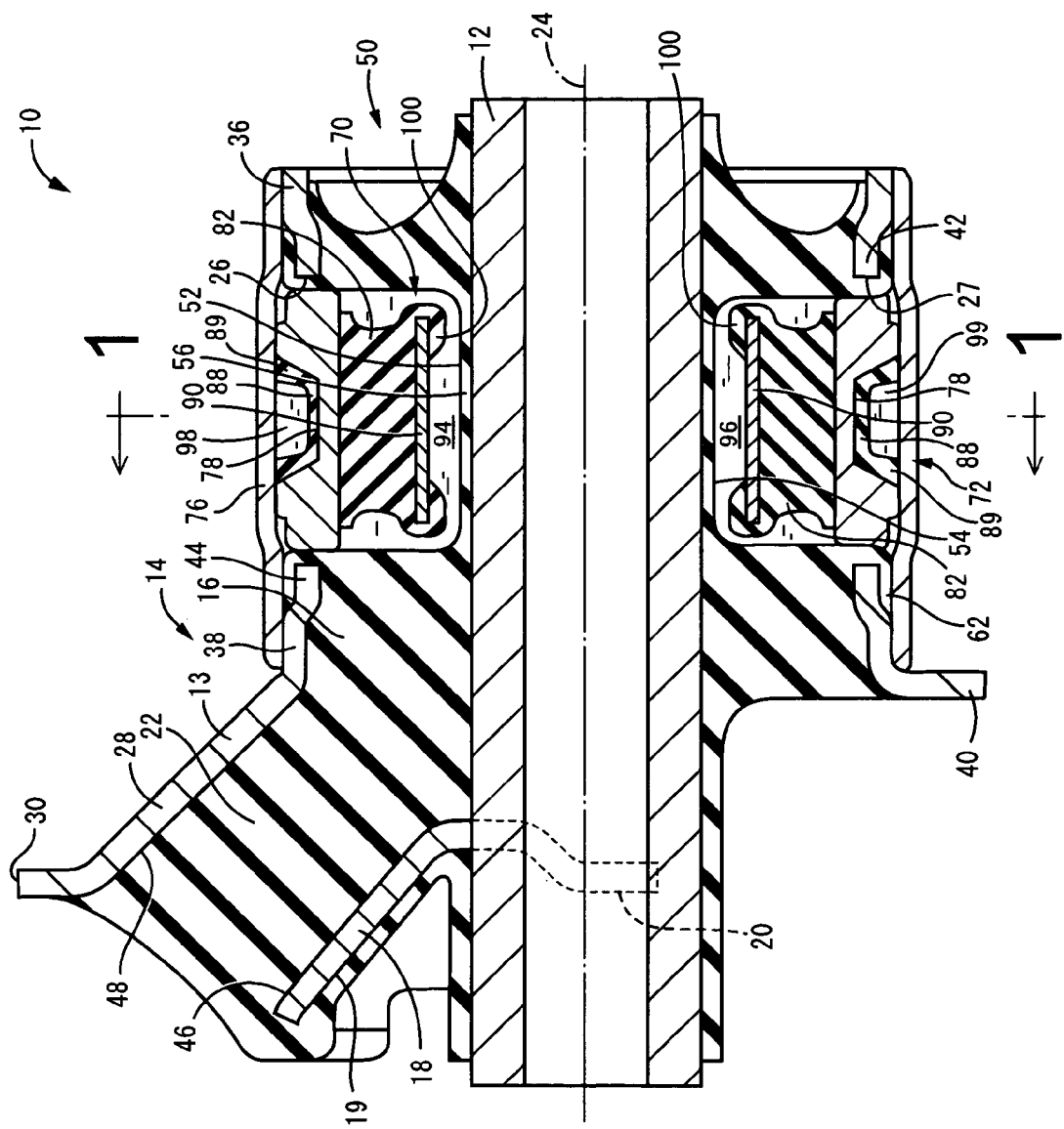
FIG. 2 is an axial or longitudinal cross sectional view of the fluid-filled cylindrical vibration damping device of FIG. 1.
Figure 3:
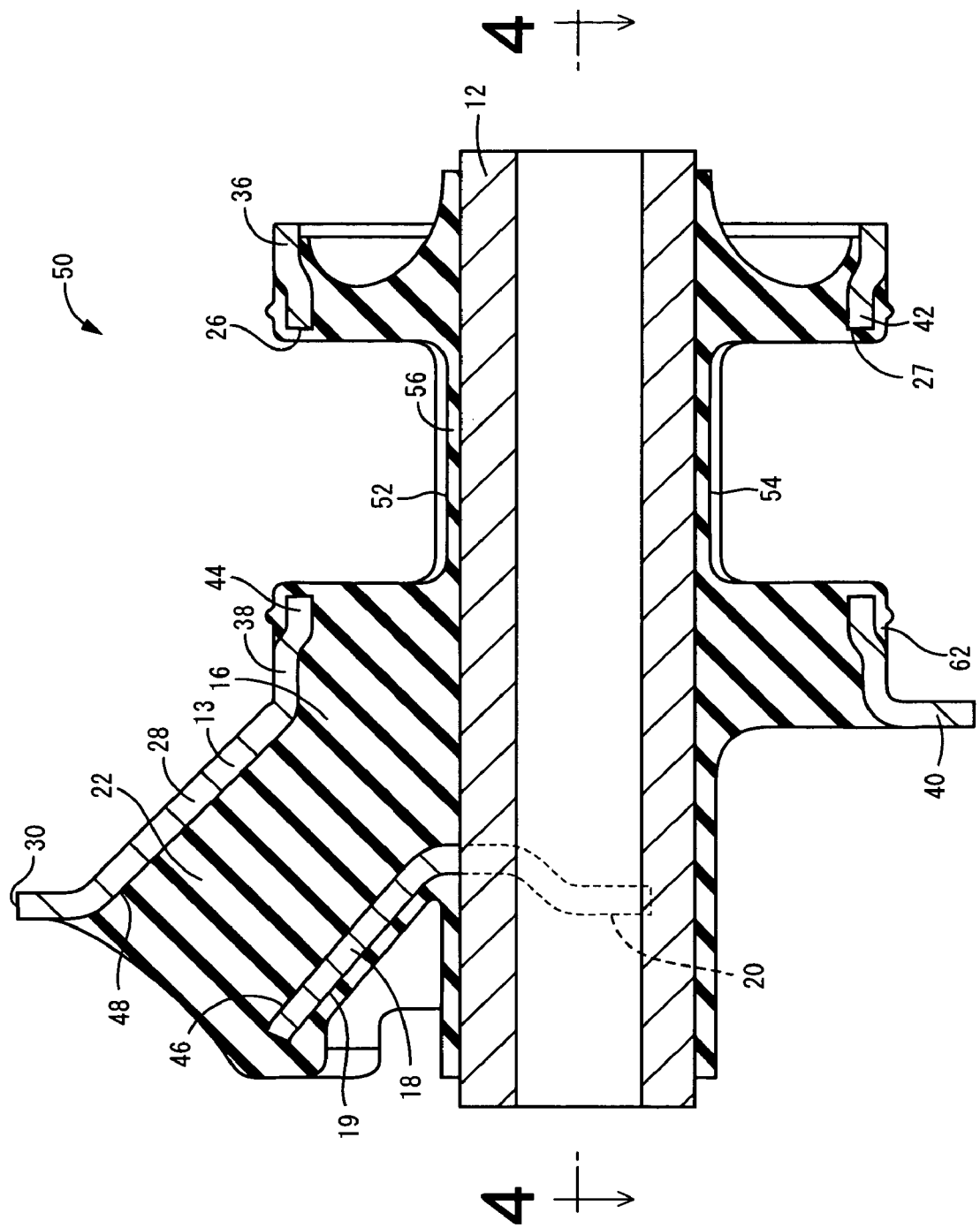
FIG. 3 is an axial cross sectional view of an integral vulcanization molded product of the fluid-filled cylindrical vibration damping device of FIG. 1.
Figure 4:
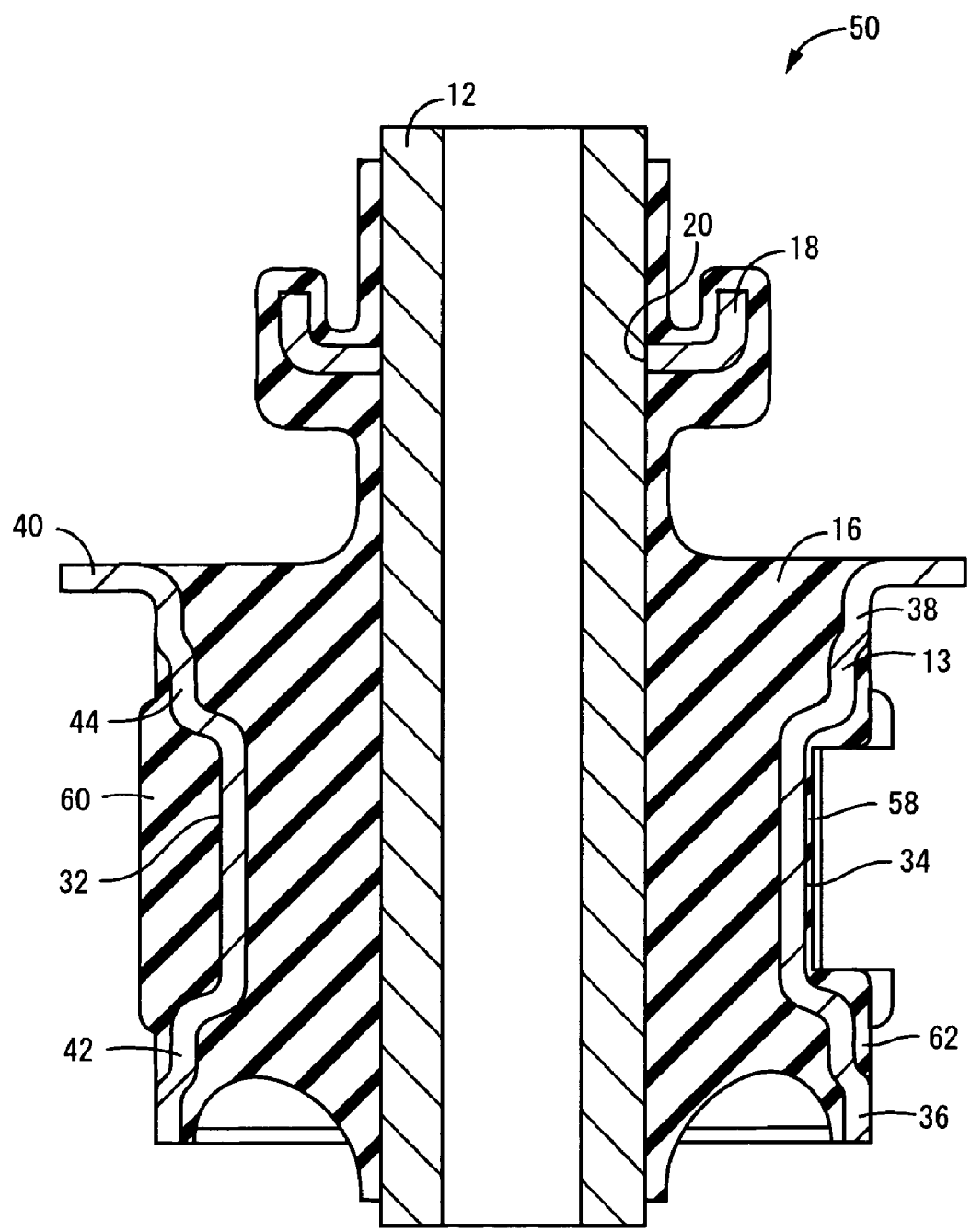
FIG. 4 is an axial cross sectional view of the integral vulcanization molded product taken along line 4—4 of FIG. 3.

Referring first to FIGS. 1 and 2, shown is a toe-correction bushing 10 according to one preferred embodiment of a fluid filled cylindrical vibration-damping device of the invention. The toe-correction bushing 10 includes an inner shaft member in the form of a metallic inner sleeve member 12, a metallic outer sleeve member 14 disposed about the inner sleeve member 12 with a diametric spacing interposed therebetween, and a rubber elastic body 16 interposed between the inner and outer sleeve members 12, 14 for elastically connecting these members together. The outer sleeve member 14 is composed of a metallic sleeve 13 and a metallic outer fitting sleeve 76.

More specifically, the inner sleeve member 12 has a thick-walled, small diameter cylindrical configuration. At one axial end portion of the inner sleeve member 12 (the left hand side as seen in FIG. 2), is bonded a fixing plate 18 of curved fun-like configuration. The fixing plate 18 is a pressed metallic member of curved fun-like plate configuration, and is formed with a fitting cutout 20 at a center of the fun-shaped portion. With the inner sleeve member 12 press fitted into the fitting cutout 20, the fixing plate 18 is welded to the inner sleeve member 12.

The fixing plate 18 of fun-like configuration has a width dimension increasing as it goes towards the one end of the inner sleeve member 12, while projecting diagonally outward in one diametric direction (the vertically upward direction as seen in FIG. 2) with a given axially outward slant with respect to a center axis 24 of the inner sleeve member 12. The slant outer surface of the fixing plate 18 serves as a slant face 19 that functions as a generally planer inner side slant portion extending diagonally outward with an appropriately constant tilt angle relative to the center axis 24 of the inner sleeve member 12. A projecting end face (i.e., an outside rim) of the fixing plate 18 is configured with an arc shape having a center located approximately on the center axis 24 of the inner sleeve member 12.

The metallic sleeve 13 has a thick-walled, large-diameter cylindrical configuration, and is disposed radially outward of the inner shaft member 12 in an approximately concentric or coaxial relationship with the inner sleeve member 12. The metallic sleeve 13 has an axial length smaller than does the inner sleeve member 12 so that the both axial ends of the inner sleeve member 12 projects axially outward from the inner sleeve member 12.

The metallic sleeve 13 is perforated through its thickness by a pair of windows 26, 27 situated at diametrically opposite circumferential positions of the axially central portion of the metallic sleeve 13. Each of the pair of windows 26, 27 has a generally rectangular configuration in a plane view, perforated through the thickness of the metallic sleeve 13. Circumferential grooves 32, 34 are formed straddling circumferential distances between circumferentially adjacent rims of the windows 26, 27, respectively, while opening in the outer circumferential surface of the metallic sleeve 13. The axial width dimension of each circumferential groove 32 or 34 is made equal to that of the windows 26, 27.

Opposite axial end portions of the metallic sleeve 13 serves as fitting portions 36, 38 of large-diameter cylindrical configuration. The diameter of the metallic sleeve 13 is made slightly small at axially inward portions of the respective fitting portions 36, 38 over a given width, thereby providing annular recessed portions 42, 44 situated on the sides of the axially opposite rims of the windows 26, 27 with these windows interposed therebetween, while extending circumferentially over the entire circumference of the metallic sleeve 13. These annular recessed portions 42, 44 are utilized for providing fluid-tight sealing of the windows 26, 27 (which will be discussed later).

To a peripheral rim portion of the one axial end portion (i.e. the left-hand side end portion as seen in FIG. 2), integrally formed is a flange portion 40 extending circumferentially while projecting diametrically outward. This flange portion 40 has an elongated section at one circumferential portion thereof (i.e., an upper side portion as seen in FIG. 2). The elongated section extends diagonally outward in the diametric direction of the inner sleeve member 12 with a given slant relative to the center axis 24 of the inner sleeve member 12, whereby the elongated section serves as an outer side slant portion in the form of a slant plate opposing portion 28 that is spaced away from the fixing plate 18 fitted on the inner sleeve member 12 in an axially diagonally diametrically outward direction, while being substantially parallel and opposed to the fixing plate 18. This slant plate opposing portion 28 provides a slant face inclined against the center axis 24 of the inner sleeve member 12 with an approximately constant tilt angle. Here, a diametric direction in which the slant plate opposing portion 28 projects and the diametric direction in which the pair of windows 26, 27 are opposed, are both conformed to the vertical direction as seen in FIG. 2.

The slant plate opposing portion 28 includes a projecting end face 30 of arc configuration with a diameter greater than the fixing plate 18, and with a circumferential length that is made sufficiently greater than that of the fixing plate 18. With this arrangement, the slant plate opposing portion 28 projects outward from and is situated on the opposite circumferential sides of the fixing plate 18. In the present embodiment, an opposing face 46 of the fixing plate 18 and an opposing face 48 of the slant plate opposing portion 28 provides mutually opposing slant faces. The opposing faces 46, 48 are parallel to each other.

The rubber elastic body 16 of overall thick-walled cylindrical shape is disposed over a substantially entire area between the diametrically opposite faces of the inner sleeve member 12 and the metallic sleeve 13. The rubber elastic body 16 is bonded at its outer circumferential surface to an inner circumferential surface of the metallic sleeve 13 through vulcanization process of a rubber material for forming thereof, and is bonded at its inner circumferential surface to an outer circumferential surface of the inner sleeve member 12 through the same vulcanization process. That is, the rubber elastic body 16 is formed as an integral vulcanization molded product 50 comprising the inner sleeve member 12 and the metallic sleeve 13.

The rubber elastic body 16 extends into a spacing between the opposite faces of the fixing plate 18 and the slant plate opposing portion 28, thereby providing a toe correction rubber elastic body 22 filling the spacing over the substantially entire area, and integrally formed with the rubber elastic body 16. The rubber elastic body 16 is continuously connected with the toe correction rubber elastic body 22 interposed between the opposing faces 46, 48 of the fixing plate 18 and the slant plate opposing portion 28.

In the axially intermediate portion of the rubber elastic body 16, there are formed a pair of pocket portions 52, 54 situated diametrically opposed to each other with the inner sleeve member 12 interposed therebetween in the diametric direction along which are projected the fixing plate 18 and the slant plate opposing portion 28. The pair of pocket portions 52, 54 have openings in the outer circumferential surface of the rubber elastic body 16. Each of the pocket portions 52, 54 is formed with a thickness dimension enough to levee a slight distance between the bottom thereof and the inner sleeve member 12, and a circumferential length that is smaller than a half of the circumference of the rubber elastic body 16 (e.g. about ⅓ of the circumference in the present embodiment). With this arrangement, a thin-walled cushion rubber layer 56 is formed secured onto and extending over the inner sleeve member 12 to provide the bottoms of the pocket portions 52, 54. The pocket portions 52, 54 are made open in the outer circumferential surface of the rubber elastic body 16 through a pair of windows 26, 27 of the metallic sleeve 13, respectively.

The circumferential grooves 32, 34 formed onto the metallic sleeve 13 is entirely coated by a coating rubber layer 58 integrally formed with the rubber elastic body 16. On the circumferential groove 32, further formed is a sealing partition 60 integrally formed with the rubber elastic body 16, and situated at a circumferentially central portion of the circumferential groove 32 to thereby substantially partition the circumferential groove 32. Similarly, a sealing rubber layer 62 integrally formed with the rubber elastic body 16 is formed adhered to surfaces of the annular recessed portions 42, 44 of the metallic sleeve 13.

The thus formed integrally vulcanization molded product 50 is assembled with a pair of metallic orifice defining members 70, 72 fitted onto an outer circumferential surface thereof. With this state, the metallic outer fitting sleeve 76 is assembled fit onto the outer circumferential surface of the orifice defining members 70, 72, whereby the metallic outer fitting sleeve 76 is assembled fit onto the metallic sleeve 13 to thereby provide the outer sleeve member 14 constituted by the metallic sleeve 13 and the outer fitting sleeve 76.

Figure 5:
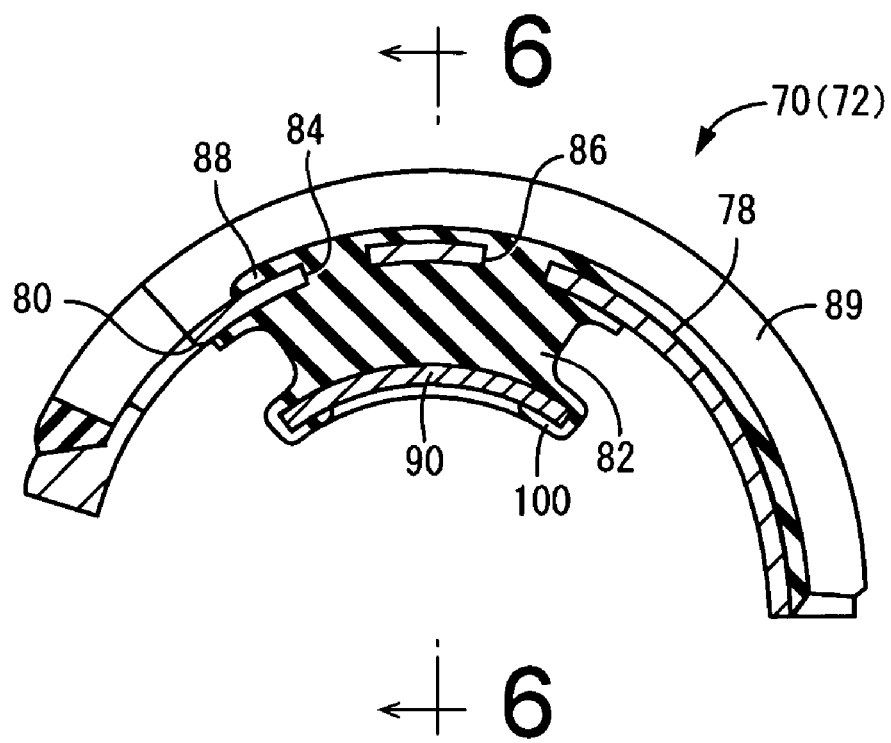
FIG. 5 is a transverse cross sectional view of an orifice defining member of the device of FIG. 1.
Figure 6:
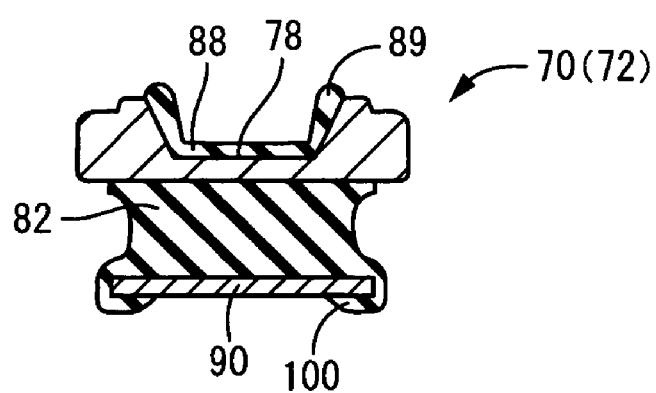
FIG. 6 is an axial cross sectional view of the orifice defining member, taken along line 6—6 of FIG. 5.

The pair of orifice defining members 70, 72 are structurally identical with each other, each having a semi annular block like configurations as shown in FIG. 5. The two orifice defining members 70, 72 are brought into fit on the integral vulcanization molded product 50 from opposite sides of one diametric direction of the product 50 in which the pair of pocket portions 52, 54 are opposed to each other, and are installed straddling circumferentially the windows 26, 27 of the metallic sleeve 13, respectively. The orifice defining members 70, 72 are fixed in position in the circumferential and axial directions with their circumferential both ends press fit into the pair of grooves 32, 34 of the metallic sleeve 13.

As shown in FIG. 5, each of the orifice defining members 70, 72 has a circumferential length of about a half of the circumference of the metallic sleeve 13, and is formed with a groove 78 open in its outer circumferential surface and extending from one circumferential end to the other continuously. One of opposite ends of the groove 78 is open in an end face of a first circumferential end of the orifice-defining member 70 (72), while the other end (dead end) of the groove 78 is open in an inner circumferential surface of the orifice defining member 70 (72) via a communication hole 80 perforated through a bottom wall portion of the member 70 (72). A second circumferential end of the orifice-defining member 70 (72) in which the dead end of the groove 78 is situated, is held in abutting contact with both sides of the sealing portion 60 formed on the metallic sleeve 13, whereby the orifice-defining member 70 (72) is situated in position in the circumferential direction.

With the orifice defining members 70, 72 assembled with the integral vulcanization molded product 50 as discussed above, the grooves 78, 78 of the orifice defining members 70, 72 are open to and connected at ones ends thereof with the pocket portions 70, 72 via the communication holes 80, 80, respectively, while being mutually connected with each other at the other ends thereof.

Each of the orifice defining members 70, 72 is provided with a stop rubber member 82 situated at a central portion in its circumferential direction, and formed on and projected from an inner circumferential surface thereof. The stop rubber member 82 is of a generally rectangular block configuration smaller than a profile of the pocket portion 52 or 54 formed in the rubber elastic body 16, and projects radially inward from the inner circumferential surface of the orifice defining member 70 (72) with a substantially constant height dimension (or radial length).

This stop rubber member 82 is formed separately from the rubber elastic body 16, and is bonded at its base portion onto the orifice defining member 70 (72) through vulcanization of a rubber material for forming itself. Thus, the orifice defining member 70 (72) and the stop rubber member 82 are formed as an integral vulcanization molded product. Since the orifice defining member 70 (72) is perforated though its thickness by through holes 84, 86 at its circumferential central portion where the stop rubber member 82 is bonded, the stop rubber member 82 extends toward the outer circumferential surface of the orifice defining member 70 (72) through the through holes 84, 86. Thus, the stop rubber member 82 is partially bonded onto an inner surface of the groove 78 to be formed as a rubber layer 88, so that the stop rubber member 82 is bonded on the orifice defining member 70 (72) with a sufficiently increased bonding area. The rubber layer 88 bonded onto the inner surface of the groove 78 projects outward from an open periphery of the groove 78 so as to provide a sealing lip 89 projecting outward of the orifice defining member 70 (72) at the open periphery of the groove 78.

A rigid restricting member in the form of a metallic restricting plate 90 is superimposed on and secured onto the projecting end portion of the stop rubber member 82. The restricting plate 90 is of approximately rectangular configuration with a circumferential curve substantially conforming to a circumferential curve of the inner circumferential surface of the orifice-defining member 70. The restricting plate 90 has an area greater than an area of a minimum cross section of the stop rubber member 82 in a direction perpendicular to a projecting direction of the stop rubber member 82. Namely, the restricting plate 90 is integrally bonded onto the projecting end portion or face of the stop rubber member 82 through vulcanization of a rubber material for forming the stop rubber member 82, with one of its opposite major surfaces (hereinafter referred to as a "front surface" where appropriate) exposed to the outside, and with the minimum cross section of the stop rubber member entirely covered by the rigid restricting plate 90, as seen in the radial direction. A peripheral portion of the front surface of the restricting plate 90 is coated with a part of the stop rubber member 82 formed thereon and extending over its entire circumference with a generally constant thickness dimension. By this part of the stop rubber member 82, an abutment rubber 100 is provided on the peripheral portion of the front surface of the restricting plate 90.

Referring back to FIG. 1, the metallic outer fitting sleeve 76 having a thin-walled large-diameter cylindrical configuration is mounted radially outwardly onto the integral vulcanization molded product 50 that has been assembled with the orifice defining member 70, 72, and then is subjected to all directional drawing operation or the like, to have the diameter made small. Thus, the outer fitting sleeve 76 is secured force fit onto the outer circumferential surfaces of the metallic sleeve 13, and the orifice defining members 70, 72. In other words, the orifice defining members 70, 72 are securely assembled with respect to the metallic sleeve 13 by means of the outer fitting sleeve 76 forcedly fitted thereon. Also, by means of the outer fitting sleeve 76 are forcedly compressed the sealing rubber layer 62 formed on the circumferential grooves 32, 34 of the metallic sleeve 13 as well as the sealing lip 89 formed on the orifice defining member 70, 72, thereby assuring fluid-tight sealing at interfaces between the metallic sleeve and the outer fitting sleeve 76, and between the orifice defining members 70, 72 and the outer fitting sleeve 76.

With the orifice defining members 70, 72 as well as the outer fitting sleeve 76 securely assembled with the integral vulcanization molded product 50 of the rubber elastic body 16, the openings of the pair of pocket portions 52, 54 are fluid-tightly closed, thereby providing a pair of fluid chambers 94, 96 functioning as a fluid sealing region partially defined by the rubber elastic body 16. The pair of fluid chambers 94, 96 has non-compressible fluid chamber sealed therein, which may be desirably selected from among water, alkylene glycol, polyalkylene glycol, silicone oil or similar materials. In order to advantageously exhibit vibration damping action based on resonance of the fluid, which will be described later, a non-compressible fluid having a viscosity of 0.1 Pa·s or smaller is preferably selected. The pair of fluid chambers 94, 96 undergo relative internal pressure fluctuation due to elastic deformation of the rubber elastic body 16, when subjected to input vibrational load in the diametric direction in which the two chambers 94, 96 are opposed to each other.

With the outer fitting sleeve 76 fitted thereon, the circumferential groove 78 formed on the orifice defining members 70, 72 are fluid-tightly closed, formed are orifice passages 98, 99 permitting fluid communication between the pair of fluid chambers 94, 96. The orifice passages 98, 99 have respective passages lengths and passage cross-sectional areas, which are suitably determined with wall spring stiffness of the fluid chambers 94, 96, a density of the non-compressible fluid sealed therein or other parameter taken into consideration. With this arrangement, the orifice passages 98, 99 are tuned so that desired vibration damping effects are exhibited based on resonance or flows of the fluid flowing through the orifice passages 98, 99 with respect to intended frequency ranges of vibrations, respectively.

The toe correction bushing 10 of construction as described above will be installed on a torsion beam type suspension system As well known in the art, two toe corrections bushings 10 are needed for mounting the torsion beam type suspension system on the vehicle, and each of which is secured press fit into a mounting bore of a trailing arm on either side (left-side and right-side) thereof, while being fixed onto the body of the vehicle by means of an mounting bolt extending through the bore of the inner sleeve member 12. With the two toe correction bushings 10 installed on the torsion beam type suspension system as described above, when the rubber elastic body 16 undergoes elastic deformation due to an input vibrational load in the diametric direction conforming to a longitudinal or driving direction of the vehicle, the relative fluid pressure fluctuation will be induced between the pair of fluid chambers 94, 96, inducing fluid flows flowing through the orifice passages 98, 99 between the two chambers 98, 99. Accordingly, each toe correction bushing 10 is able to provide an effective vibration damping performance based on resonance of the fluid flowing through the orifice passages 98, 99, with respect to intended frequency vibrations, such as harshness.

It is also appreciated that the stop rubber members 82, 82 formed on the orifice defining members 70, 72, are respectively housed within the pair of fluid chambers 94, 96 each being projecting radially outward from the outer sleeve member 14 side toward the inner sleeve member 12 so that the projecting end face of the stop rubber member 82 opposed to the inner sleeve member 12 with a predetermined radial spacing therebetween. When the toe correction bushing 10 is subjected to a relatively large vibrational load in a diametric or axis perpendicular direction, the projecting end face of each stop rubber member 82 comes into abutting contact against the inner sleeve member 12 via the cushion rubber layer 56, thereby limiting an amount of relative displacement between the inner sleeve member 12 and the outer sleeve member 14 in the axis-perpendicular direction or diametric direction in a vibration damping fashion.

With this regards, the restricting plate 90, which is provided on the projecting end face of each stop rubber member 82, is coated at its outer peripheral portion by means of the abutment rubber 100 projecting toward the side of the cushion rubber layer 56 side. This arrangement prevents direct contact of the restricting plate 90 against the cushion rubber layer 56, even when the toe correction bushing 10 is subjected to a relatively large vibrational load in the diametric direction. Instead, the abutment rubber 100 comes into direct abutting contact with the cushion rubber layer 56, thereby minimizing or reducing impact or abutting noises generated upon abutment between the inner and outer sleeve members 12, 14, leading to enhanced durability as well as a low possibility of generation of noises. Further, the abutment rubber 100 is secured by vulcanization of its rubber material onto the rigid restricting plate 90, so that an amount of elastic deformation of the abutment rubber 100 can be minimized, while generation of noises due to stick slip motion of the abutment rubber 100 is reduced, leading to improved durability of the abutment rubber 100.

Owing to the presence of the restricting plate 90, the input vibrational load applied to the stop rubber member 82 can be distributed over a wide area of the stop rubber member 82, permitting the stop rubber member 82 to undergo compression deformation with stability. That is, the stop rubber member 82 can exhibit spring characteristics suitable for a stopper. Namely, the stop rubber member 82 exhibits a low spring stiffness at an initial stage of vibration input, and increases its spring stiffness in a non-linear manner as the input vibrational load increases. Therefore, the stop rubber member 82 is able to effectively absorb impact at the initial stage of vibration input, and exhibits a large spring stiffness when the load applied to the stop rubber member 58 considerably increases as a result of increase in an amount of relative displacement between the inner and outer sleeve members 12, 14. This makes it possible to surely limit an excess amount of relative displacement between the inner and outer sleeve members 12, 14.

It should be appreciated that the restricting plate 90 is secured onto the stop rubber member 82 with an area larger than that of the diametric compression face of the stop rubber member 82. Namely, meant by the diametric compression face of the stop rubber member 82 is an effective area or a minimum cross section of the stop rubber member 82 in a direction perpendicular to the projecting direction of the stop rubber member 82. That is, the restricting plate 90 bonded on the projecting end face of the stop rubber member 82 extends over an area larger than that of the minimum cross section of the stop rubber member 82 (see FIG. 1 where the restricting plate 90 has a widthwise dimension larger than the minimum widthwise dimension of the stop rubber member 82 in transverse cross section, and FIG. 2 where the restricting plate 90 has a widthwise dimension larger than the minimum widthwise dimension of the stop rubber member 82 in axial cross section). With this arrangement, an effective compression force can be exerted on the overall stop rubber member 82, when the stop rubber member 82 comes into abutting contact against the inner sleeve member 12. Even when the stop rubber member 82 is subjected to an eccentric input load, e.g., an input load in a prizing direction, for example, the eccentric input load is effectively distributed by means of the restricting plate 90, making it possible to exert the input load entirely over the stop rubber member 82, thereby ensuring a further effective stop action.

While the toe correction bushing 10 installed on the torsion beam type suspension system is likely to induce relative displacement between the inner and outer sleeve members 12, 14 in the prizing direction when subjected to input vibration in the axis perpendicular direction, the presence of the restricting plate 90 allows the toe correction bushing 10 of the present embodiment to exhibit an excellent stopper action by means of the stop rubber member 82, even when the toe correction bushing 10 is subjected to the eccentric input load in the prizing direction, as discussed above.

While the presently preferred embodiment of the invention has been discussed above for the illustrative purpose only, it should be appreciated that the present invention is not limited to the details of the illustrated embodiment.

For instance, the inner shaft member and the outer sleeve member may be eccentrically positioned relative to each other in the axis-perpendicular direction thereof in a no-load applied state before installed on the vehicle, where appropriate.

While the abutment rubber is formed on the entire outer peripheral portion of the restricting plate in the illustrated embodiment, the abutment rubber is required to coat at least the four corner of the outer peripheral portion of the restricting plate. The abutment rubber may also be formed on a central portion with a chip-like shape or another part of the restricting plate, as needed, for thereby adjusting abutting impact or noises, or alternatively improving durability of the abutment rubber, for example.

The number of stop rubber member housed in the fluid chamber is not limited to one as in the illustrated embodiment. A plurality of number of stop rubber members may be housed within the fluid chamber, while being desirably arranged on the basis of knowledge of a person those skilled in the art. For instance, the stop rubber members may be arranged in positions mutually symmetrical with respect to the inner sleeve member.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical vibration damping device comprising:

an inner shaft member;

an outer sleeve member disposed about the inner shaft member;

a rubber elastic body elastically connecting the inner shaft member and the outer sleeve member;

a fluid-sealing region formed between the inner shaft member and the outer sleeve member, and having a non-compressible fluid sealed therein;

a stop rubber member disposed within the fluid-sealing region and projecting from one of the inner shaft member and the outer sleeve member toward an other of the inner shaft member and the outer sleeve member; and a rigid restricting member bonded on a projecting end portion of the stop rubber member, wherein the vibration damping device exhibits a vibration damping effect based on flow action of the non-compressible fluid flowing within the fluid sealing region during vibration input, wherein a part of the stop rubber member extends across the rigid restricting member so as to form an abutment rubber situated on and projecting from an outer peripheral portion of a front surface of the rigid restricting member so that the projecting end portion of the stop rubber member is brought into abutting contact with the other of the inner shaft member and the outer sleeve member with the abutment rubber, and wherein the inner shaft member includes at one axial end portion thereof an inner-side slant portion projecting diagonally outward in a diametric direction of the inner shaft member, and the outer sleeve member includes at a corresponding axial end portion thereof an outer-side slant portion projecting diagonally outward in a diametric direction of the outer sleeve member, axially opposed to the inner-side slant portion and with a spacing therebetween, and elastically connected to the inner-side slant portion via a toe correction rubber elastic member interposed therebetween.

2. A fluid-filled cylindrical vibration-damping device according to claim 1, wherein the rigid restricting member comprises a rigid restricting plate of generally rectangular configuration with a circumferential curve conforming to that of the abutting surface of the other of the inner shaft member and the outer sleeve member, and the part of the stop rubber member extending across the rigid restricting plate is at least presented on four corners of the rigid restricting plate to form the abutment rubber.

3. A fluid-filled cylindrical vibration-damping device according to claim 1, wherein a cushion rubber layer is formed on the other of the inner shaft member and the outer sleeve member against which the stop rubber member comes into abutting contact.

4. A fluid-filled cylindrical vibration-damping device according to claim 1, wherein the fluid-sealing region comprises at least two fluid chambers inducing relative pressure fluctuation during input of vibration to the device, and arranged spaced away from each other in a circumferential direction of the device, while being held in fluid communication with each other via an orifice passage, wherein the rubber elastic body has at least one pocket portion open in an outer circumferential surface thereof, whose opening is fluid-tightly closed by the outer sleeve member so as to form at least one of the at least two fluid chambers, wherein an orifice defining member is disposed bridging circumferentially the opening of the at least one pocket portion so that the orifice passage is formed and extends between superimposed surfaces of the orifice defining member and the outer sleeve member, and wherein the stop rubber member is bonded onto an inner circumferential surface of the orifice defining member so that the stop rubber member disposed within the fluid chamber while projecting from the orifice defining member toward the inner shaft member.

5. A fluid-filled cylindrical vibration damping device according to claim 1, wherein the abutment rubber has a configuration extending over a substantially entire circumference of the outer peripheral portion of the rigid restricting member.

6. A fluid-filled cylindrical vibration-damping device according to claim 1, wherein the rigid restricting member has a widthwise dimension larger than a minimum widthwise dimension of the stop rubber member in transverse cross section, and has a widthwise dimension larger than a minimum widthwise dimension of the stop rubber member in axial cross section.

7. A fluid-filled cylindrical vibration-damping device according to claim 1, wherein the rigid restricting member has an area greater than an area of a minimum cross section of the stop rubber member in a direction perpendicular to a projecting direction of the stop rubber member so that the minimum cross section of the stop rubber member is entirely covered by the rigid restricting member.

8. A fluid-filled cylindrical vibration-damping device according to claim 1, wherein the stop rubber member is substantially entirely formed of a rubber elastic body.

* * * * *